United States Patent [19]

Nakamura et al.

[11] Patent Number: 5,432,655
[45] Date of Patent: Jul. 11, 1995

[54] MULTIPLE CHANNEL MAGNETIC RECORDING AND REPRODUCING APPARATUS

[75] Inventors: Akihiko Nakamura, Osaka; Haruo Isaka, Yawata; Makoto Gotou, Nishinomiya, all of Japan

[73] Assignee: Matsushita Electric Industrial Co., Ltd., Osaka, Japan

[21] Appl. No.: 51,530

[22] Filed: Apr. 22, 1993

[51] Int. Cl.[6] .................................................. G11B 15/14
[52] U.S. Cl. .................................................... 360/64
[58] Field of Search ................... 360/61, 62, 64, 77.14, 360/77.15, 77.08

[56] References Cited

U.S. PATENT DOCUMENTS

| | | | |
|---|---|---|---|
| 4,544,962 | 10/1985 | Kato et al. | 360/40 |
| 4,860,125 | 8/1989 | van der Meer | 360/77.14 X |
| 4,870,510 | 9/1989 | Edakubo et al. | 360/27 |
| 4,899,232 | 2/1990 | Odaka et al. | 360/48 |
| 4,982,297 | 1/1991 | Tsujisawa | 360/77.04 |
| 5,010,424 | 4/1991 | Hasegawa et al. | 360/77.14 |
| 5,109,305 | 4/1992 | Ohsawa et al. | 360/77.15 X |
| 5,119,249 | 6/1992 | Uchikoshi | 360/77.14 X |
| 5,124,850 | 6/1992 | Kizu | 360/33.1 |
| 5,146,373 | 9/1992 | Wakui et al. | 360/77.14 X |
| 5,218,454 | 6/1993 | Nagawasa et al. | 358/343 |
| 5,233,488 | 8/1993 | Yanagihara | 360/77.14 X |
| 5,253,130 | 10/1993 | Kaaden et al. | 360/77.15 X |
| 5,255,253 | 10/1993 | Kagami et al. | 369/44.28 |
| 5,258,879 | 11/1993 | Shimotashiro et al. | 360/77.14 |

*Primary Examiner*—Donald Hajec
*Assistant Examiner*—Thien Minh Le
*Attorney, Agent, or Firm*—Ratner & Prestia

[57] ABSTRACT

A multiple channel magnetic recording and reproducing apparatus records data on oblique tracks on a tape by a leading head and trailing head mounted on a rotating drum. First and second pilot areas for tracking are turned at opposite ends of each track. A tracking error detector is provided for receiving, when the leading head is scanning the first pilot area, a first reproduced signal from the first head, and for detecting two pilot signals from the tracks on both sides of a scanning track, and for generating a first tracking error signal indicative of a difference between the detected two pilot signals. Similarly, the tracking error detector receives, when the trailing head is scanning the second pilot area, a second reproduced signal from the second head, and for detecting two pilot signals from tracks on both sides of a scanning track, and for generating a second tracking error signal indicative of a difference between the detected two pilot signals.

4 Claims, 7 Drawing Sheets

MULTIPLE CHANNEL MAGNETIC RECORDING AND REPRODUCING APPARATUS

BACKGROUND OF THE INVENTION

1. Field of the invention

The present invention relates to a multiple channel magnetic recording and reproducing apparatus for recording video, audio, data, and other data types to magnetic tape and reproducing the recorded data therefrom, and more particularly to a multiple channel magnetic recording and reproducing apparatus for recording and reproducing the oblique track on the tape by means of a pair of helical scanning heads.

2. Description of the Prior Art

While video cassette recorders and other magnetic recording and reproducing apparatuses for recording data to magnetic tape are very practical and are commonly used today, smaller, digital devices are being developed by applying higher density recording technologies. In order to increase the recording density and maintain compatibility with the installed software base, precise tracking of the head with the data track is essential. Existing technologies enable this by recording a control signal on one edge of the tape length using a fixed magnetic head. This recorded control signal is then reproduced using the same fixed magnetic head. Tracking was controlled to maintain a constant phase relationship between the reproduced control signal and the rotational position of the rotary heads. This is the standard method used on a VHS-format VCR.

The drawback to this method is that a dedicated fixed magnetic head must be used for tracking control. Providing this fixed magnetic head poses problems for the design of compact magnetic recording and reproducing apparatuses because of the need to provide a place for the head to be installed and other such problems. This led to the development of a method (ATF) for controlling tracking of the rotary head using only the reproduced output from the moving playback head and not using a fixed head. This ATF method is used, for example, on 8 mm VCRs. In addition to reducing the size and complexity of the recording/reproducing mechanism, ATF is an effective tracking control method with narrow data tracks and for automatic tracking adjustment.

The sector area ATF method used in DAT (digital audio tape recorder) is suited to recording and reproducing digital signals, with which time-base compression and decompression can be used. Unlike analog signals, continuous time base recording/reproduction is not necessary with digital signals. As a result, one track is divided into plural areas, and a tracking pilot signal is recorded in different areas from data (audio or subcode in DAT) area. These tracking pilot signal areas are normally provided in two areas, specifically the first and second halves of the one track. This is to maintain tracking control even if the data is damaged and one of the pilot signals is lost. When a track deviates from the optimum signal pattern, a servo is driven based on the average value of the tracking signal calculated from pilot signals in two locations to reduce the deviation from normal tracking.

The most important feature of the sector area ATF method is that tracking control is possible even during insertion editing. This means that if this sector area ATF is applied to a digital VCR, a VCR with a separate insertion editing function can be achieved. This is possible by dividing and recording the video, audio, index, and other digital signals to separate areas, and recording the tracking pilot signal to a dedicated pilot signal area. The insertion editing function referred to here is a function for separately rewriting the video, audio, index, and other signals (or any subset thereof) to tape.

Systems for recording, in order from the beginning of the tape, the first pilot area, audio area, video area, and second pilot area are currently available. The audio signal rewriting operation is described below.

When the rotary head scans the first and second pilot areas, the rotary head outputs the reproduced signal. The pilot signal detected from this reproduced signal is used for tracking control. When the rotary head scans the audio area, the new audio signal is recorded by the rotary head, overwriting the old audio signal. Continuity between the new track and the previously recorded (not overwritten) track is thus maintained at the end point of the insertion because normal tracking is maintained during the insertion.

Problems arise, however, when this tracking method is used to enable insertion editing in a system using a pair of heads for recording and reproducing. When a pair of heads is used, the output from only one of the heads is usually used for tracking control. The other head is installed in close proximity to the tracking control head with the relative positions thereof precisely maintained, making it possible control the tracking of this second head at the same time. The problems arise when a position shift occurs in the track between the heads. Specifically, while the head of the channel used for tracking passes through the pilot area at the end of the track (second pilot area), the other channel head will still be scanning the data signal area (the video, audio, and index areas) for a certain period. This is true when the leading head is used for tracking control. When the trailing head is used for tracking control, the same situation occurs as the head passes through the pilot area at the beginning of the track (first pilot area). In either case, there will be a period in which the tracking channel head is in the reproducing mode and the other head is simultaneously in the recording mode necessary to overwrite the data signal. Because of the construction of the rotary transformer on the rotary drum on which rotary heads are mounted, it is not possible to set the heads to separate reading and writing modes for each channel. While the current used for recording is on the order of several milliamperes, the current used for reading is on the order of several microamperes. As a result, the playback signal cannot be detected due to recording current crosstalk, and if this playback signal cannot be detected, tracking control is also not possible.

In other words, even though two pilot areas are provided on the track, the playback signal from the one channel cannot be used for tracking control because it cannot be detected. As a result, when the tape is damaged and the pilot signal which can be detected when reproduced is lost, tracking cannot be maintained. In addition, if the signal reproduced from one channel cannot be detected, mistracking will become extremely high when the track deviates from the optimum pattern.

SUMMARY OF THE INVENTION

Therefore, an object of the present invention is to provide a multiple channel magnetic recording and reproducing apparatus using a pair of heads and providing excellent tracking precision even during insertion editing.

To achieve this object, a magnetic recording and reproducing apparatus according to the present invention records a oblique track on the magnetic tape by means of a pair of heads mounted on the rotary drum. Pilot areas to which the pilot signal for tracking control is recorded are formed on the oblique tracks, and plural pilot areas are formed in one track.

The magnetic recording and reproducing apparatus according to the present invention comprises a switching means for switching the head used according to the position on the track in the pilot areas, and outputting the playback signal; a tracking detection means for detecting the tracking error signal from the pilot signal included in the playback signal output from the switching means; and a tape drive means for driving the magnetic tape according to the tracking error signal.

At least one of the plural pilot areas in one track is provided in the first half of the track, and the other is in the second half of the track. The invention is characterized by the leading head being used for pilot signal detection and tracking control in the pilot area provided in the first half track, and the trailing head being used for pilot signal detection and tracking control in the pilot area provided in the second half track.

Stable tracking control can be achieved by means of the invention because the pilot signal can be detected in all pilot areas even during insertion editing and the deviation from the track center can be reduced. In effect, alignment with the position of the previously recorded track can be dynamically adjusted to enable rewriting of only the desired information, and editing precision can be significantly improved.

In addition, plural pilot signals of varying frequencies are sequentially selected and recorded to the pilot areas. If the order of the recorded pilot signal sequence is offset by only one in the first and second half track pilot areas, the circuitry of the tracking detection means can be significantly simplified.

BRIEF DESCRIPTION OF THE DRAWINGS

The present invention will become more fully understood from the detailed description given below and the accompanying diagrams wherein.

DESCRIPTION OF PREFERRED EMBODIMENTS

The principle of the magnetic recording and reproducing apparatus according to the preferred embodiment of the present invention during insertion editing is described below with reference to FIG. 1.

Figure 1:
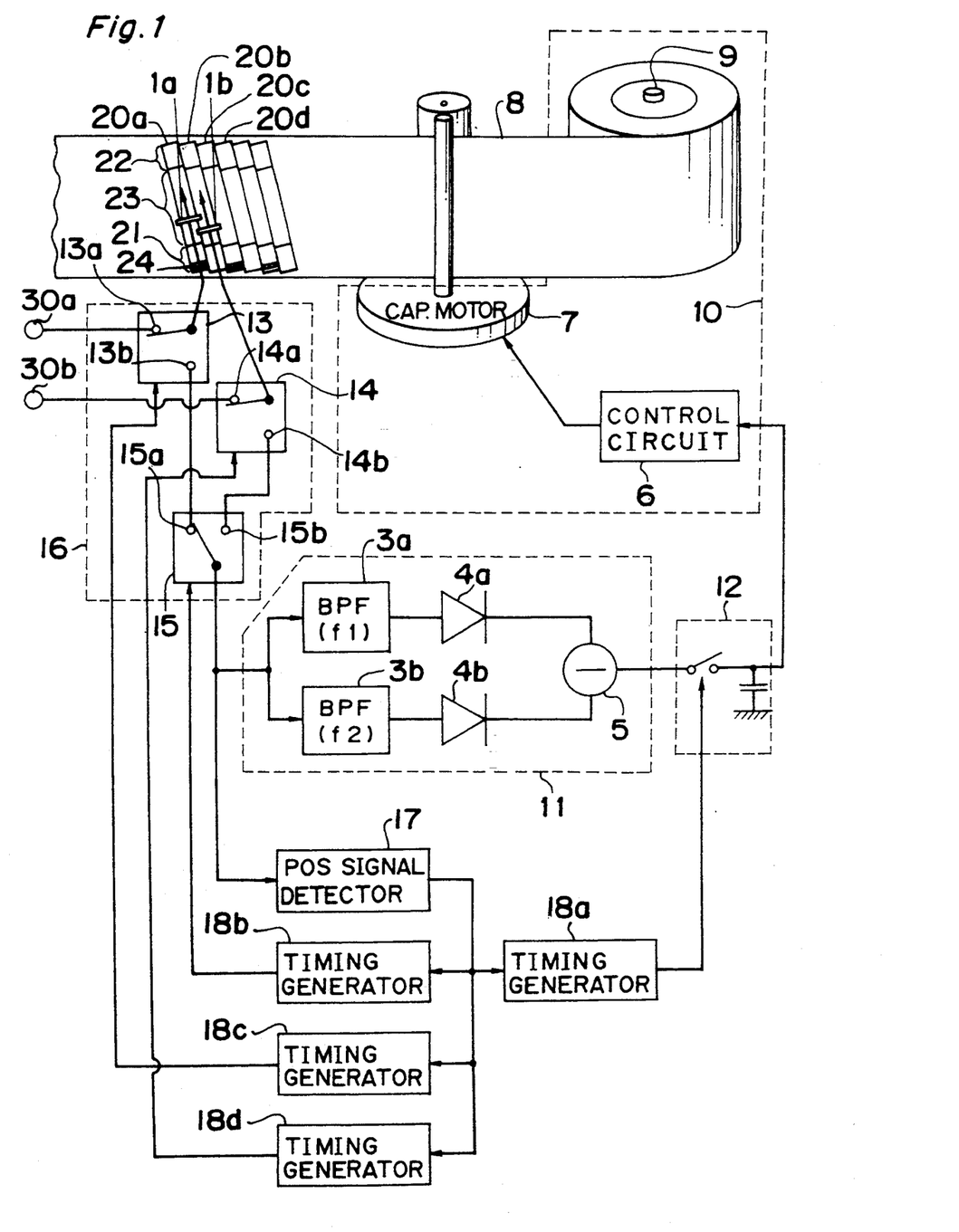
FIG. 1 is a block diagram, particularly showing a tracking control portion of the magnetic recording and reproducing apparatus according to the preferred embodiment of the present invention.

Referring to FIG. 1, magnetic heads 1a, 1b are mounted on a rotary drum not shown in FIG. 1. Plural tracks are formed on the magnetic tape 8. In FIG. 1, track pair 20a, 20b is the track pair to be edited, and track pair 20c, 20d is the pair of tracks adjacent to track pair 20a, 20b. A tracking detector 11 comprises bandpass filters 3a, 3b, envelope detectors 4a, 4b, and a difference circuit 5. The tracking detector 11 provides a difference signal to a sample hold circuit 12.

A tape drive assembly 10 comprises capstan motor control circuit 6, capstan motor 7, and take-up reel 9. The capstan motor control circuit 6 controls the capstan motor 7, and the magnetic tape 8 is taken up on the take-up reel 9.

A switch circuit 16 comprises three switches 13, 14, and 15.

A positioning signal detector 17 detects the positioning signal as will be described later, and provides outputs to the four timing generators 18a, 18b, 18c, and 18d.

Figure 2:
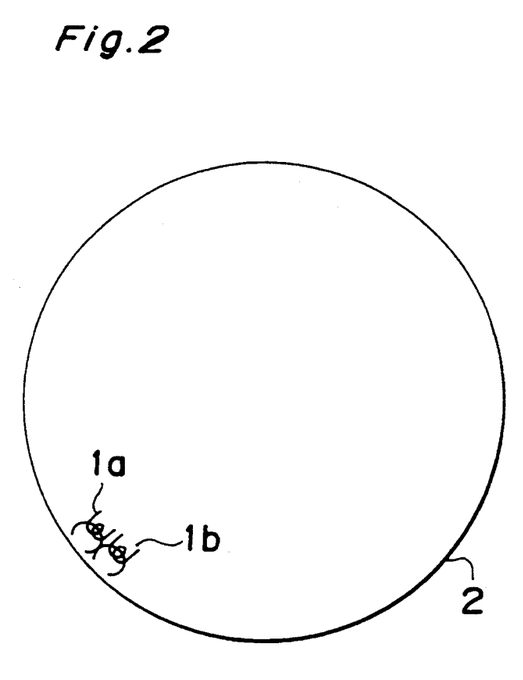
FIG. 2 is a diagram of the head positions on the rotary drum in the preferred embodiment of the invention.

In the present embodiment, the two magnetic heads 1a and 1b are installed adjacent to each other to provide a two-channel recording/playback capability. The position of the two magnetic heads 1a and 1b on the rotary drum 2 is shown in FIG. 2.

Figure 3:
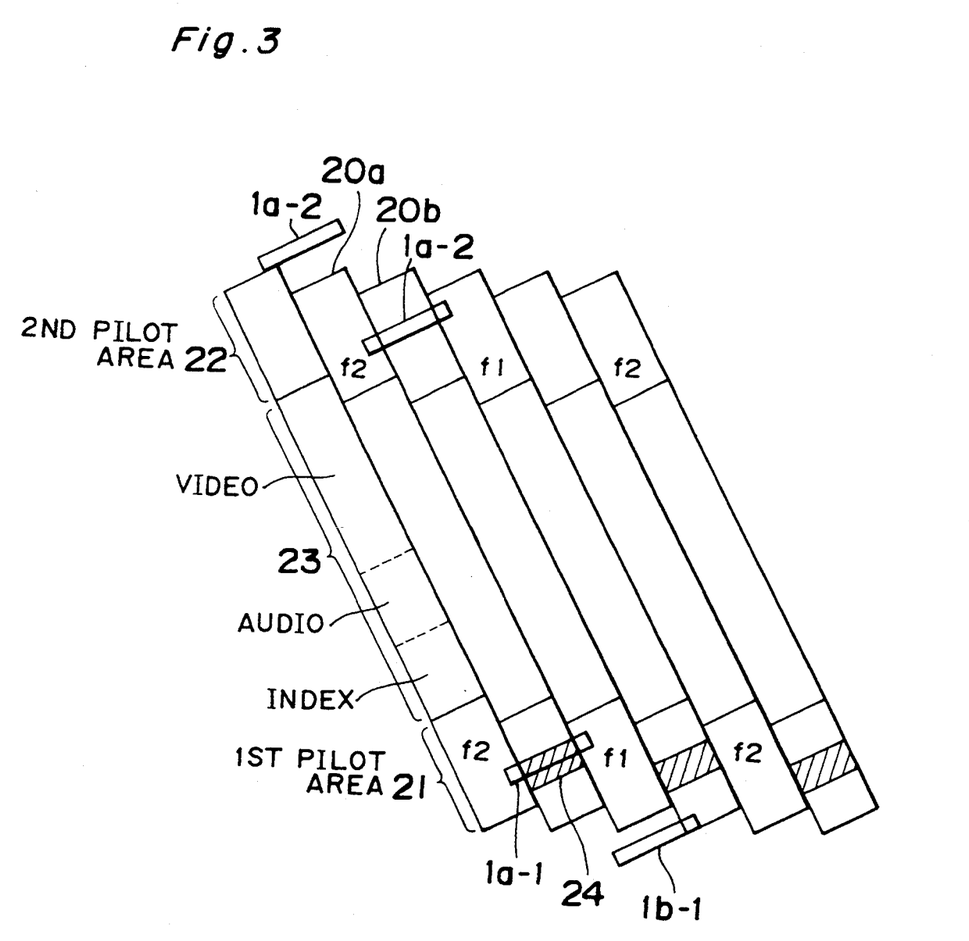
FIG. 3 is a diagram of the track arrangement in the preferred embodiment of the invention.

The tape track configuration is shown in FIG. 3. Each track comprises a first pilot area 21, second pilot area 22, and the data area 23. The audio, video, index, and other data signals are recorded to the data area 23 in different sections in the data area 23. Because the specific details of these signals are unrelated to the object and operation of the present invention, further description thereof is omitted and any signals recorded to the data area 23 are collectively referred to below as the "data signals."

A positioning signal 24 is recorded to part or all of the first pilot area 21. A tracking pilot signal is also sequentially recorded to both the first and second pilot areas 21, 22. In this embodiment, two pilot signals of frequencies f1 and f2 are alternately recorded in the first areas 21 of every other tracks, such as even tracks. Similarly, in the second areas 22 of the remaining tracks, such as odd tracks, two pilot signals of frequencies f1 and f2 are alternately recorded. Therefore, as shown in FIG. 3, the pilot signal sequence is offset one track between the first pilot area 21 and the second pilot area 22.

Figure 4:
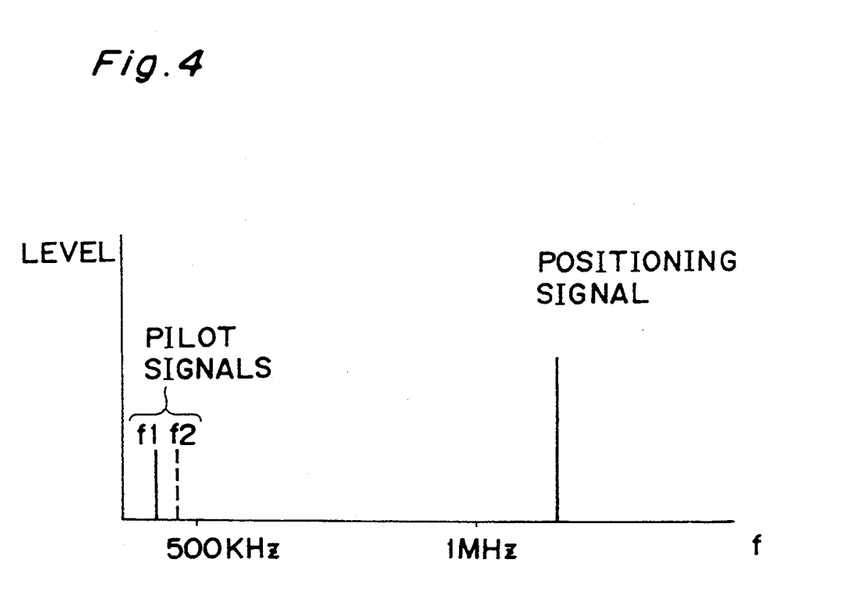
FIG. 4 is a graph of the recording spectrum of the pilot signal recorded to the track and the positioning signal in the preferred embodiment of the invention.

The recording spectrum at the site to which the positioning signal 24 is recorded in the first pilot area 21 is shown in FIG. 4. The frequencies f1 and f2 of the two pilot signals are a relatively low frequency and are resistant to azimuth loss. On the other hand, the positioning signal having a relatively high frequency is resistant to crosstalk from adjacent tracks.

How tracking is controlled using this track configuration is described next.

Referring to FIG. 3, when the one head 1a passes the first pilot area 21 in track 20a, such as when the heads are positioned at 1a-1 and 1b-1 in FIG. 3, the pilot signal components f1, f2 from the adjacent tracks are picked up by the head 1a. At this state, switches 13, 14 and 15 are so turned to contacts 13b, 14b, and 15a, respectively, as will be described later. This is the playback state for the signals from the magnetic heads 1a, 1b, and the signal from the leading head 1a is transmitted through switches 13 and 15 to the tracking detector 11. The timing for changing the switches 13, 14 and 15 is controlled by the timing signals from the timing generators 18b, 18c, and 18d, each comprising, e.g., a counter and a flip-flop circuit. This timing will be described in more detail later. Then, by comparing the amplitude of pilot components f1, f2 detected from the magnetic heads 1a, the tracking control of the head relative to the target track is carried out.

The frequency f1, f2 components detected by the bandpass filters 3a, 3b are converted to a D.C. voltage component according to the frequency level by the envelope detectors 4a, 4b, and the voltages are then compared by the difference circuit 5. The output of the difference circuit 5 is the tracking error signal expressing the difference (relative position) between the head 1a and the track 20a. The tracking error signal is then applied to the capstan motor control circuit 6 through the sample hold circuit 12, which operates at the timing described later.

The capstan motor control circuit 6 controls tape travel by moving the capstan motor 7 so that the head 1a can be aligned along the center of the track 20a. The other head 1b is extremely close to the first head 1a, and so that the tracking control of head 1a eventually results in the tracking control of head 1b. As a result, the second magnetic head 1b simultaneously tracks track 20b correctly. When the second magnetic head 1b passes the second pilot area 22 in track 20b, such as when the heads are at 1a-2 and 1b-2 in FIG. 3, this same operation is performed and tracking of the magnetic head 1b relative to track 20b is controlled. In this case, the tracking of the leading head 1a with respect to track 20a is eventually controlled.

The insertion editing operation for recording a new data signal over the previous data signal in the tracks formed as shown in FIG. 3 is described below. When the head 1a begins to scan the track 20a, switches 13, 14, and 15 are turned to contacts 13b, 14b, and 15a, respectively, so that the playback signal is reproduced by head 1a is directed to bandpass filters 3a and 3b and also to positioning signal detector 17. While the head 1a scans the first pilot area 21, the difference circuit 5 outputs the tracking error signal as described above. The operation after this point is described using FIG. 5 below.

Figure 5:
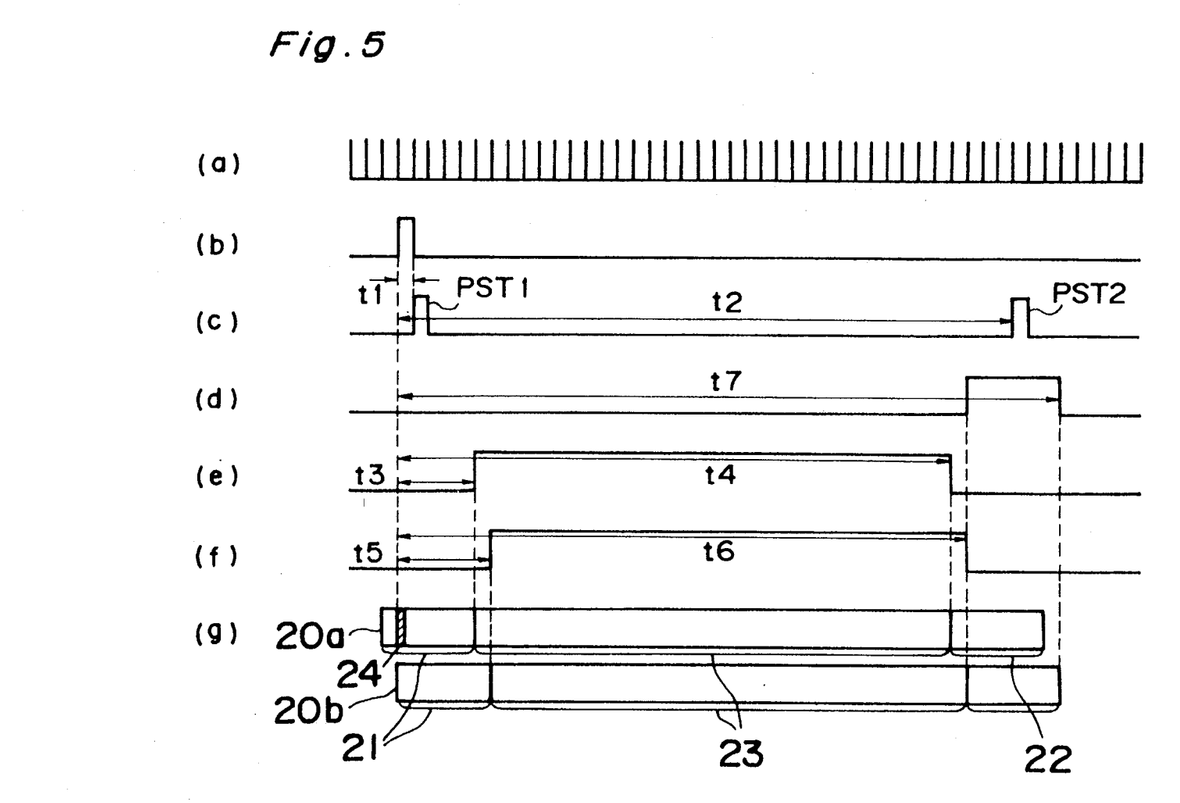
FIG. 5 is a signal time chart during insertion editing of the magnetic recording and reproducing apparatus of FIG. 1.

In FIG. 5, row (g) shows the tracks 20a and 20b, making it possible to compare the track position and signal output timing.

The output from head 1a is input to the positioning signal detector 17. The positioning signal detector 17 has a bandpass filter which detects the frequency of the positioning signal 24 recorded to the first pilot signal area 21, and produces a pulse signal (FIG. 5, waveform (b)) representing the location of the positioning signal 24. The pulse signal is first input to the first timing generator 18a, causing the timing generator 18a to start counting time t1 and t2 based on the internal clock (FIG. 5, waveform (a)) of the magnetic recording and reproducing apparatus. After counting time t1 and time t2, pilot sampling signals PST1 and PST2 are generated, respectively, as shown in FIG. 5, waveform (c). By the pilot sampling signals PST1 and PST2, the switch in the sample hold circuit 12 temporarily closes to sample the tracking error signal from the tracking detector 11. Thus, the tracking error signal is sampled from the first pilot area 21 of track 20a by head 1a, and also from the second pilot area 22 of track 20b by head 1b. The sampled tracking error signal is input to the capstan motor control circuit 6 to control the tracking of the heads 1a, 1b to the tracks 20a, 20b.

The pulse signal from the positioning signal detector 17 is also input to the third timing generator 18c which counts times t3 and t4 to produce a timing signal as shown in FIG. 5, waveform (e). The timing signal from the third timing generator 18c is used for turning switch 13 between contacts 13a and 13b. When the third timing generator 18c output is HIGH, switch 13 is turned to contact 13a, as shown in FIG. 1; but when the output is LOW, switch 13 is turned to contact 13b. The head 1a scans the data area 23 of the track 20a during the period when the timing signal from timing generator 18c is HIGH, i.e., from the end of delay time t3 to the end of time t4. When the switch 13 is set to contact 13a, the data signal applied from a data source (not shown) to terminal 30a is recorded by the head 1a. When the switch 13 is set to contact 13b, the playback signal from the head 1a is applied to contact 15a of switch 15. In other words, while the head 1a is scanning the data area 23 of the track 20a, the data signal applied to the terminal 30a is recorded. While the head 1a scans the first pilot area 21 or the second pilot area 22 of the track 20a, the playback signal from the head 1a is input to switch 15 contact 15a.

The pulse signal from the positioning signal detector 17 is also input to the fourth timing generator 18d which counts times t5 and t6 to produce a timing signal as shown in FIG. 5, waveform (f). The timing signal from the fourth timing generator 18d is used for turning switch 14 between contacts 14a and 14b. When the fourth timing generator 18d output is HIGH, switch 14 is turned to contact 14a; but when the output is LOW, switch 14 is turned to contact 14b. The second head 1b scans the data area 23 of the track 20b during the period when the timing signal from timing generator 18d is HIGH, i.e., from the end of delay time t5 to the end of time t6. When the switch 14 is set to contact 14a, the data signal applied from a data source (not shown) to terminal 30b is recorded by the head 1b. When the switch 14 is set to contact 14b, the playback signal from the head 1b is applied to contact 15b of switch 15. In other words, while the head 1b is scanning the data area 23 of the track 20b, the data signal input from the terminal 30b is recorded. While the head 1b scans the first pilot area 21 or the second pilot area 22 of the track 20b, the playback signal from the head 1b is input to switch 15 contact 15b.

The pulse signal from the positioning signal detector 17 is also input to the second timing generator 18b which counts time t6 and t7 to produce a timing signal as shown in FIG. 5, waveform (d). The timing signal from the second timing generator 18b is used for turning switch 15 between contacts 15a and 15b. When the second timing generator 18b output is HIGH, switch 15 is turned to contact 15b; but when the output is LOW, switch 15 is turned to contact 15a. As described above, at the end of delay time t6, the head 1b finishes scanning the data area 23 of track 20b and begins scanning the second pilot area 22. At the end of delay time t7, the head 1b finishes scanning the second pilot area 22. The playback signals from the two heads 1a, 1b are input to the contacts 15a and 15b of switch 15. As a result, when switch 15 is set to contact 15a, the playback signal from the head 1a is input to the tracking detector 11 and the positioning signal detector 17. When switch 15 is set to contact 15b, the playback signal from the head 1b is input to the tracking detector 11 and the positioning signal detector 17. As a result, during the period in which the head 1a scans the first pilot area 21 of track 20a, the playback signal from the leading head 1a is input to the tracking detector 11 and to the positioning signal detector 17. During the period in which the head 1b scans the second pilot area 22 of track 20b, the playback signal from the trailing head 1b is input to the tracking detector 11 and to the positioning signal detector 17.

As described above, by changing the position of switches 13, 14, and 15 according to the timing signals generated by the timing generators 18b–18d, the overall operation of the magnetic recording and reproducing apparatus is regulated as follows.

(1) Heads 1a and 1b scan virtually simultaneously, but head 1a leads. This leading head 1a begins scanning the first pilot area 21, and the playback signal therefrom is input to the tracking detector 11 and positioning signal detector 17.

(2) The positioning signal 24 is detected by the positioning signal detector 17, and a pulse signal (FIG. 5, waveform (b)) is produced. The timing for switch operation is determined based on the output timing of this pulse signal.

(3) The tracking error signal in the first pilot area 21 is generated by the tracking detector 11 based on the playback signal from the leading head 1a. This tracking error signal is sampled according to the pilot sampling timing PTS1 by the first timing generator 18a, and the tracking error signal is input to the capstan motor control circuit 6.

(4) While the leading head 1a scans the data area 23, the data signal from the terminal 30a is recorded over the previous data.

(5) Because of the position of the trailing head 1b relative to the leading head 1a on the drum, the trailing head 1b scans the corresponding track at a slight delay from the leading head 1a. When the head 1b scans the first pilot area 21, the head 1b outputs the playback signal, but not producing any tracking error signal. Thus, at this time, even if the leading head 1a is carrying out a recording using a relatively high current, such a high current will not give any affect in obtaining the tracking error signal. Then, when this head 1b scans the data area 23, the data signal from terminal 30b is recorded.

(6) The tracking error signal in the second pilot area 22 is generated by the tracking detector 11 based on the playback signal from the trailing head 1b. This tracking error signal is sampled according to the pilot sampling timing signal PST2 by the first timing generator 18a, and the tracking error signal is input to the capstan motor control circuit 6.

(7) While the trailing head 1b scans the second pilot area 22, the leading head 1a also scans the second pilot area 22 and outputs the playback signal, but not producing any tracking error signal. Thus, at this time, even if the trailing head 1b is carrying out a recording using a relatively high current, such a high current will not give any affect in obtaining the tracking error signal.

According to this embodiment, tracking control in the first pilot area 21 is achieved by detecting the pilot signals by the leading head 1a at the opposite ends thereof, and is achieved in the second pilot area 22 by detecting the pilot signals by the trailing head 1b at opposite ends thereof. As a result, it is not necessary to take the recording current crosstalk into consideration during insertion editing. Since the tracking error can be detected in both of the first and the second pilot areas, the insertion editing precision can be improved with an apparatus of simple construction.

Correct tracking can also be maintained even if one of the detection signals is lost due, for example, to signal drop-out because tracking control is based on detection of the pilot signal in two locations, i.e., at the opposite ends of each track. In addition, even if the track deviates slightly from the ideal pattern, deviation from the ideal tracking position can be minimized because a servo is driven using the average of the detection signals from two locations.

In addition, when the pilot signals are recorded by sequentially switching between plural signal frequencies, the tracking error detection circuit can be shared and the construction thus simplified if the sequence of pilot signals recorded to the second pilot signal recording area is offset by one phase relative to the first pilot signal recording area. In this case, the pilot signal detected when the leading head 1a passes the first pilot signal recording area and the pilot signal detected when the trailing head 1b passes the second pilot signal recording area will be the same, and a single detection circuit can be used.

Next, a circuit for recording a tape in a format shown in FIG. 3 is described.

Figure 6:
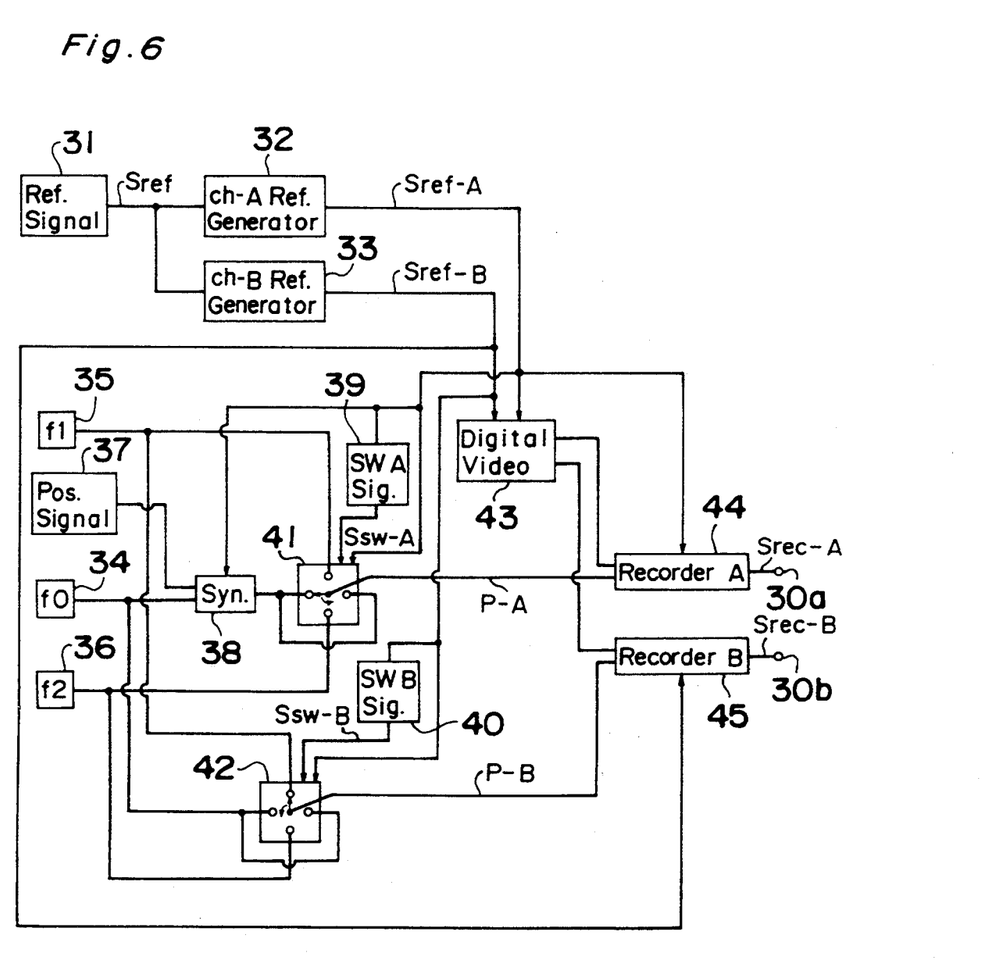
FIG. 6 is a block diagram, particularly showing a formatting portion of the magnetic recording and reproducing apparatus according to the preferred embodiment of the present invention.

Referring to FIG. 6, a block diagram of a formatting portion of the magnetic recording and reproducing apparatus according to the preferred embodiment of the present invention is shown. A reference signal generator 31 generates a reference signal Sref (FIG. 7, waveform (a)) which is applied to both channel A reference generator 32 and channel B reference generator 33. Channel A reference generator 32 has a timer (not shown) for counting times t11 and t12 for generating a channel A reference signal Sref-A (FIG. 7, waveform (b)). Similarly, channel B reference generator 33 has a timer (not shown) for counting times t13 and t12 for generating a channel B reference signal Sref-B (FIG. 7, waveform (f)). During the period in which the signal Sref-A is HIGH, the leading head 1a writes one odd number track, and during the period in which the signal Sref-B is HIGH, the trailing head 1b writes one even number track.

Two pilot signal generators 35 and 36 are provided for producing pilot signals having frequencies f1 and f2. A dummy pilot signal generator 34 is provided for producing a dummy pilot signal having a frequency f0 which can be any frequency other than f1 and f2 mentioned above. A positioning signal generator 37 generates a positioning signal 24. A synthesizer 38 is provided for inserting the positioning signal 24 in a predetermined position in the first pilot section 21 that should be recorded with the dummy pilot signal having a frequency f0.

Figure 7:
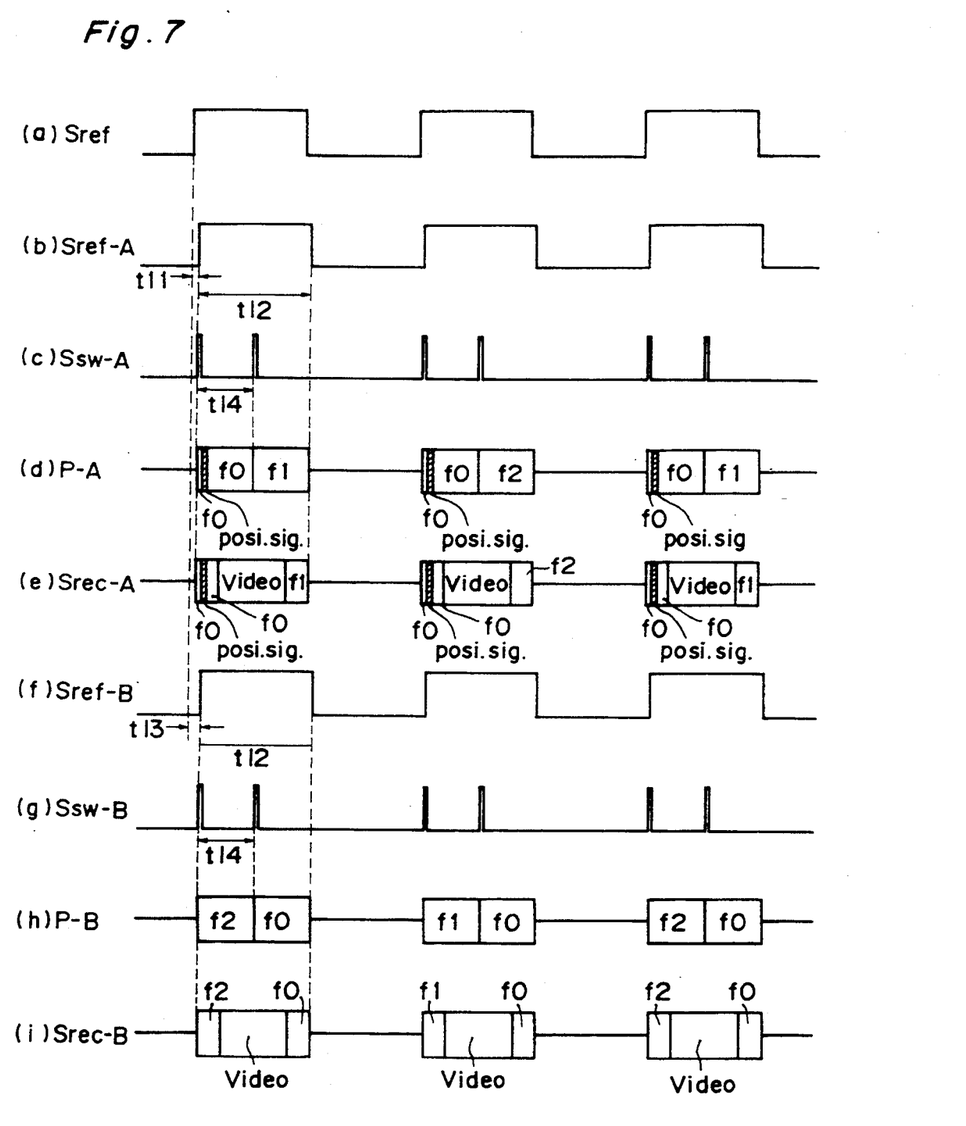
FIG. 7 is a signal time chart during recording of the magnetic recording and reproducing apparatus of FIG. 6.

An A-channel switching signal generator 39 has a timer (not shown) for counting time t14 for generating an A-channel switching signal Ssw-A (FIG. 7, waveform (c)). The A-channel switching signal generator 39 generates a first switching pulse in response to the receipt of signal Sref-A, and a second switching pulse after counting time t14.

Similarly, a B-channel switching signal generator 40 has a timer (not shown) for counting time t14 for generating a B-channel switching signal Ssw-B (FIG. 7, waveform (g)). The B-channel switching signal generator 40 generates a first switching pulse in response to the receipt of signal Sref-A, and a second switching pulse after counting time t14.

An A-channel switching circuit 41 has four input terminals for receiving pilot signals having frequencies of f1, f0, f2, f0, respectively, and one output for sequentially producing four different pilot signals in said order as the switching arm rotates in response to the first and second switching pulses from the A-channel switching signal generator 39. Therefore, from the output of the A-channel switching circuit 41, a combined pilot signal P-A (FIG. 7, waveform (d)) is produced.

Similarly, a B-channel switching circuit 42 has four input terminals for receiving pilot signals having frequencies of f1, f0, f2, f0, respectively, and one output for sequentially producing four different pilot signals in said order as the switching arm rotates in response to the first and second switching pulses from the B-channel switching signal generator 40. Therefore, from the output of the B-channel switching circuit 42, a combined pilot signal P-B (FIG. 7, waveform (h)) is produced.

Since the switching arm of the B-channel switching circuit 42 is delayed by one pitch (a quarter of rotation in the example shown in FIG. 6) from that of the A-channel switching circuit 41, the frequencies of the pilot signals in the A-channel combined pilot signal P-A and those in the B-channel combined pilot signal P-B are different such that when f0 (first occurrence) is present in signal P-A, f2 is present in signal P-B; when f1 is present in signal P-A, f0 is present in signal P-B; when f0 (second occurrence) is present in signal P-A, f1 is present in signal P-B; and when f2 is present in signal P-A, f0 is present in signal P-B.

A digital video generator 43 generates digital video signal (can be in combination with audio signal and index signal as shown in FIG. 3) which is inserted in the A-channel combined pilot signal P-A in a recorder 44 which thereupon produces an A-channel recording signal Srec-A for the recording through the leading head 1a.

Similarly, the digital video signal is inserted in the B-channel combined pilot signal P-B in a recorder 45 which thereupon produces a B-channel recording signal Srec-B for the recording through the trailing head 1b.

Note that the above embodiment has been described with two pilot signal recording areas provided in a single track, but the same result is obtained when three or more pilot signal recording areas are provided. For example, if a pilot signal recording area is provided in three locations, e.g., at the beginning, middle, and end of each track, the data signal area will be divided into at least two areas, but the effects of recording current crosstalk can be prevented by appropriately assigning the channel of the head used for tracking control according to the area to be edited. More specifically, crosstalk problems can be avoided in this case by detecting any tracking error in the middle pilot signal recording area with the trailing head when editing the first-half data signal recording area and with the leading head when editing the second-half data signal recording area.

It is to be noted that the present embodiment was described using two tracking control pilot signals, but pilot signals of four different frequencies can also be used as in 8 mm video. In addition, the input method of the positioning signal shall not be limited to that described above, and detection of digital pattern matching can also be used. The positioning signal in this embodiment is recorded only to the pilot area provided in the first half of the track and scanned by the leading head, but this position shall not be so limited. For example, the positioning signal can be recorded to the pilot area provided in the second half of the track and scanned by the trailing head with sampling timed to detect the tracking error signal in this second-half pilot area. In addition, the positioning signal can be recorded to the pilot area provided in the first half of the track scanned by the travelling track, and the timing regulated to control the switching between recording and playback by the travelling head.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multiple channel magnetic recording and reproducing apparatus for recording data on oblique tracks on a recording tape comprising:
    at least first and second pilot areas and a data area on each track, said first pilot area resides within a first half of a track, said second pilot area resides within a second half of the track, and said data area resides between said first and second pilot areas;
    first and second heads mounted on a rotating drum adjacent to each other, wherein said first head leads said second head by a predetermined distance when scanning a track;
    first switching means, coupled to said first head, for either providing a signal to be recorded to said first head or outputting a signal being reproduced by said first head in response to a first control signal;
    second switching means, coupled to said second head, for either providing a signal to be recorded to said second head or outputting a signal being reproduced by said second head in response to a second control signal;
    third switching means, coupled to said first and second switching means, for outputting a playback signal from said first switching means when said first head is scanning a first pilot area and for outputting a playback signal from said second switching means when said second head is scanning a second pilot area in response to a third control signal;
    tracking error detection means connected to said third switching means for receiving a playback signal and for detecting two pilot signals from tracks on both sides of a scanning track, and for generating a tracking error signal indicative of a difference between said detected two pilot signals.

2. An apparatus as claimed in claim 1, further comprising a tape speed control means for controlling the tape speed in response to the tracking error signal.

3. An apparatus as claimed in claim 1, further comprising:
    a first pilot signal generator for generating a first pilot signal having a first predetermined frequency;
    a second pilot signal generator for generating a second pilot signal having a second predetermined frequency;

a dummy pilot signal generator for generating a dummy pilot signal having a frequency other than said first and second predetermined frequency;

a first combining means for combining said first, second and dummy pilot signals and for producing a first combined signal produced in the order of first, dummy, second dummy pilot signals;

a second combining means for combining said first, second and dummy pilot signals and for producing a second combined signal produced, in nearly synchronized relationship with said first combined Signal, in the order of dummy, first, dummy, second pilot signals;

a first data signal inserting means for inserting data signal in said first combined signal and for producing a first recording signal; and a second data signal inserting means for inserting data signal in said second combined signal and for producing a second recording signal.

4. A multiple channel magnetic recording and reproducing apparatus for recording data on oblique tracks on a recording tape with each track having at least first and second pilot areas and a data area, said apparatus comprising:

first and second heads mounted on a rotating drum adjacent to each other;

first switching means, coupled to said first head, for either providing a signal to be recorded to said first head or outputting a signal being reproduced by said first head in response to a first control signal;

second switching means, coupled to said second head, for either providing a signal to be recorded to said second head or outputting a signal being reproduced by said second head in response to a second control signal;

third switching means, coupled to said first and second switching means, for outputting a playback signal from said first switching means when said first head is scanning a first pilot area and for outputting a playback signal from said second switching means when said second head is scanning a second pilot area in response to a third Control signal;

tracking error detection means connected to said third switching means for receiving, during when said first head is scanning said first pilot area a first reproduced signal from said first head, and for detecting two pilot signals from tracks on both sides of a scanning track, and for generating a first tracking error signal indicative of a difference between said detected two pilot signals;

said tracking error detection means connected to said third switching means for receiving, during when said second head is scanning said second pilot area, a second reproduced signal from said second head, and for detecting two pilot signals from tracks on both sides of a scanning track, and for generating a second tracking error signal indicative of a difference between said detected two pilot signals;

a first pilot signal generator for generating a first pilot signal having a first predetermined frequency;

a second pilot signal generator for generating a second pilot signal having a second predetermined frequency;

a dummy pilot signal generator for generating a dummy pilot signal having a frequency other than said first and second predetermined frequency;

a first combining means for combining said first, second and dummy pilot signals and for producing a first combined signal produced in the order of first, dummy, second dummy pilot signals;

a second combining means for combining said first, second and dummy pilot signals and for producing a second combined signal produced, in nearly synchronized relationship with said first combined signal, in the order of dummy, first, dummy, second pilot signals;

a first data signal inserting means for inserting data signal in said first combined signal and for producing a first recording signal;

a second data signal inserting means for inserting data signal in said second combined signal and for producing a second recording signal, said first and second switching means for switching between a reproducing state in which said first head or said second head is connected to said third switching means and a recording state in which said first and second head are connected to said first and second data signal inserting means.

* * * * *

UNITED STATES PATENT AND TRADEMARK OFFICE
CERTIFICATE OF CORRECTION

PATENT NO.   : 5,432,655  
DATED        : July 11, 1995  
INVENTOR(S)  : Nakamura et al.

It is certified that error appears in the above-identified patent and that said Letters Patent is hereby corrected as shown below:

Column 11, line 12, "Signal" should be --signal--.

Column 11, line 42, "Control" should be --control--.

Column 12, line 1, after "area" insert a comma --,--.

Signed and Sealed this

Seventh Day of November, 1995

Attest:

BRUCE LEHMAN

*Attesting Officer*     *Commissioner of Patents and Trademarks*